United States Patent
Ishikawa et al.

[11] 3,929,770
[45] Dec. 30, 1975

[54] PROCESS FOR PREPARATION OF STEROID DERIVATIVE

[75] Inventors: Masayuki Ishikawa; Chikara Kaneko, both of Tokyo; Tatsuo Suda, Tachikawa; Sachiko Yamada, Kawagoe; Yukuo Eguchi, Chiba; Akiko Sugimoto, Hino; Satoshi Sasaki, Higashiyamato, all of Japan

[73] Assignee: Wisconsin Alumni Research Foundation, Madison, Wis.

[22] Filed: Dec. 3, 1974

[21] Appl. No.: 529,140

[30] Foreign Application Priority Data
Dec. 3, 1973 Japan............................. 48-134394
Dec. 3, 1973 Japan............................. 48-134395

[52] U.S. Cl. ...... 260/239.55; 260/397.2; 204/157.1
[51] Int. Cl.² .......................................... C07J 17/00
[58] Field of Search ................... 260/239.55, 397.2

[56] References Cited
UNITED STATES PATENTS
3,476,779  11/1969  Ishikawa et al. ............... 260/239.55

Primary Examiner—Elbert L. Roberts
Attorney, Agent, or Firm—Howard W. Bremer

[57] ABSTRACT

1α-hydroxychlecalciferol is prepared by reacting cholestra-1,5,7-trien-3β-ol with a triazoline-3,5-dione derivative represented by the formula:

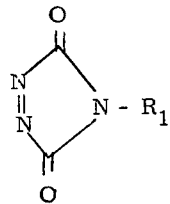

wherein $R_1$ represents an alkyl group or an aryl group, reacting the resulting 1,4-cyclized adduct represented by the formula:

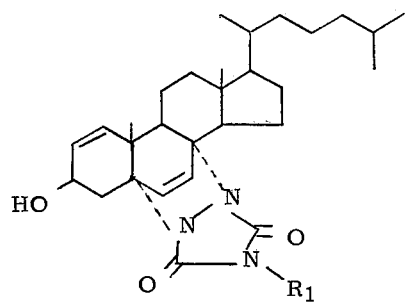

wherein $R_1$ is defined above, with a peroxide, reducing the resulting 1α,2α-epoxide compound represented by the following general formula:

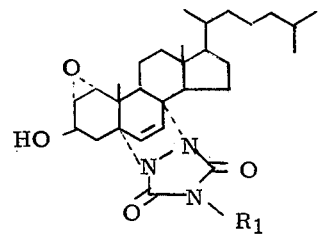

wherein $R_1$ is defined above, with an alkali metal aluminum hydride, subjecting the resulting cholesta-5,7-diene-1α,3β-diol to radiation of ultraviolet rays to obtain 1α,3β-dihydroxyprovitamin $D_3$, isomerizing cholesta-1,4,6-trien-3-one in the presence of a basic catalyst and reducing the resulting cholesta-1,5,7-trien-3-one with a metal boron hydride.

In another aspect, this invention refers to the novel intermediates

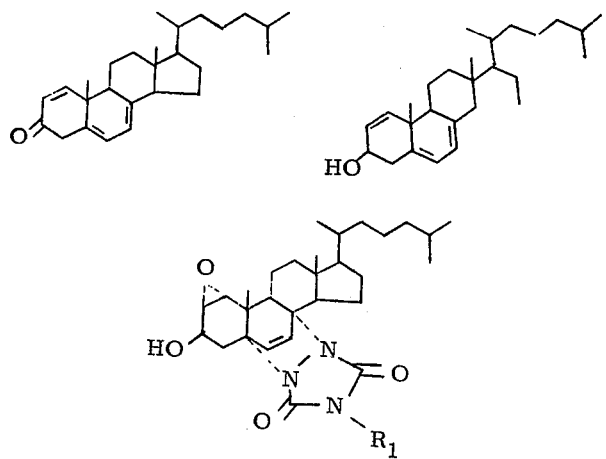

5 Claims, No Drawings

PROCESS FOR PREPARATION OF STEROID DERIVATIVE

BACKGROUND OF THE INVENTION

1. Field of the Invention

This invention refers to a steroid derivative which has a much higher vitamin D-like biological activity than vitamin $D_2$ and vitamin $D_3$, and to processes and intermediates used for preparing the same.

2. Description of the Prior Art

The process for the synthesis of 1α-hydroxychloecalciferol is known from DeLuca et al. (see Japanese patent application laid-open specification no. 62750/73) and Barton et al (see Journal of the American Society, 95, p. 2748,1973). Each of these known methods passes through a diacetyl derivative of 1α,3β-dihydroxyprovitamin $D_3$, and in order to form the 5,7-diene atomic group in this intermediate compound, in each of these known methods, such severe reaction steps as introduction of the bromine atom into the 7-position and subsequent formation of $\Delta^{7,8}$ double bond by dehydrobromination should be performed. At these steps, 2-hydroxyl groups at the 1α- and 3β-positions should be protected with an acetyl group or the like. Accordingly, this protective group should be split off at the subsequent step. Further, such undesired side reactions as isolation of the 1α-acetoxy group (axial form) and rearrangement of the double bond in the product are caused to occur simultaneously with the dehydrobromination, and therefore, reduction of the yield cannot be avoided and the product should be subjected to complicated refining operations.

DETAILED DESCRIPTION OF THE PREFERRED EMBODIMENTS

In one aspect of this invention, cholestra-1,5,7-trien-3-ol represented by the formula

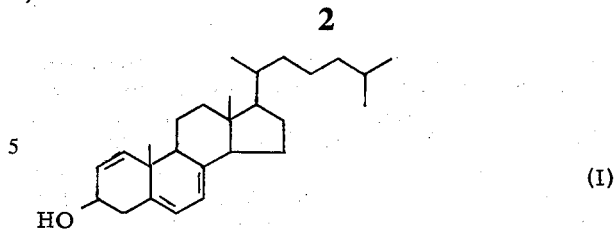

which is a novel intermediate, is prepared by isomerizing cholesta-1,4,6-trien-3-on (II) in the presence of a basic catalyst and reducing the resulting cholesta-1,5,7-trien-3-one (III) with a metal boron hydride.

In this application, Roman numerals denote compounds indicated by the same Roman numerals in the reaction formula given below.

The process of this invention is represented by the following reaction formula:

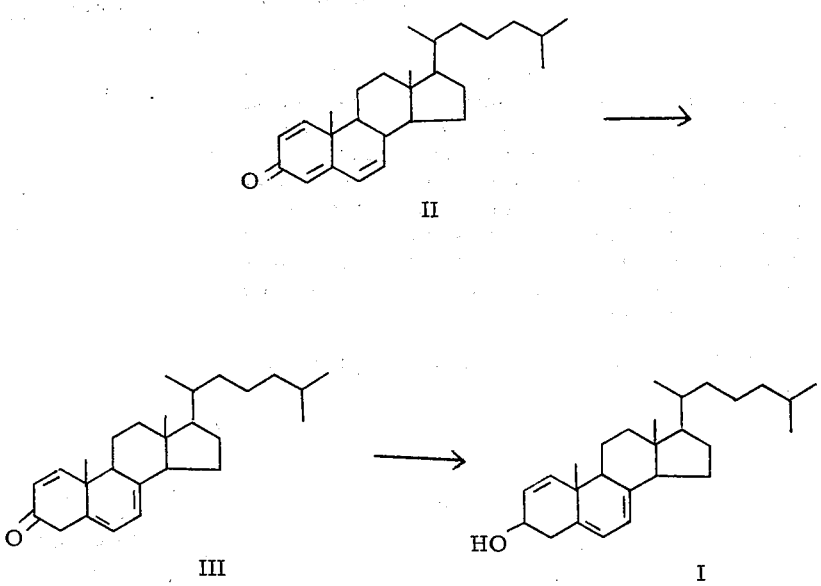

The intermediate III is also a novel intermediate.

The compound of the formula (II) to be used as the starting compound in the process of this invention can easily be prepared according to the method disclosed in Journal of the Organic Chemistry, 15, p. 898(1950).

At the first step of this reaction, the two double bonds located at $\Delta^{4,5}$ and $\Delta^{6,7}$ positions are isomerized to $\Delta^{5,6}$ and $\Delta^{7,8}$ positions, respectively, in the presence of a basic catalyst. In practicing this step, the compound of the formula (II) is reacted by the action of a basic catalyst in a solvent, such as ether, isopropyl ether, tetrahydrofuran, dimethylsulfoxide, tertiary butyl alcohol or mixtures thereof in an inert gas atmosphere. An alkali metal alkoxide, such as potassium tertiary butoxide is excellent as the basic catalyst. Further, it is also possible to use an alkali metal acetylide such as lithium acetylide or an ethylenediamine adduct of lithium acetylide in a suspension in xylene or toluene. It is preferred that the reaction be carried out at a low temperature, for example, 0° to 20°C. The so prepared compound of the formula (III) can be isolated and purified according to customary procedures, and then fed to the next step. However, since the compound of the formula (III) is unstable to heat, it is preferred that the compound (III) be directly forwarded to the next step without isolation.

At the second step, the compound of the formula (III) is reduced with a metal boron hydride in a solvent. Suitable solvents include, for example, methanol, ethanol, propanol, tetrahydrofuran and diethyl ether. Suitable metal boron hydrides include sodium boron hydride, potassium boron hydride, lithium boron hydride, etc. It is also possible to use a mixture of such metal boron hydride with an alkaline earth metal halide, such as calcium chloride, calcium bromide, magnesium chloride and magnesium bromide. For instance, good results can be obtained by using sodium boron hydride and calcium chloride in combination. It is preferred that the reaction be carried out at a low temperature, for example 0° to 20°C. The excess remaining metal boron hydride is decomposed and then, the product is easily separated and purified according to customary procedures.

Cholesta-1,5,7-trien-3β-ol prepared according to the process of this invention is valuable as an intermediate for synthesis of 1α-hydroxycholecalciferol having a much higher vitamin D-like biological activity than vitamin $D_2$ and vitamin $D_3$. The intended product of the process of this invention can be synthesized by very simple operations and very short steps according to this invention, and from this compound, 1α-hydroxycholecalciferol can be prepared in a good yield under very mild conditions.

1α-hydroxycholecalciferol represented by the following formula:

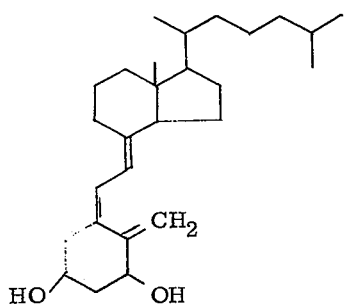

V is prepared by reacting cholesta-1,5,7-trien-3β-ol (I) with a triazolone-3,5-dione represented by the following formula:

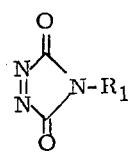

VI wherein $R_1$ represents an alkyl or aryl group, reacting the resulting triazoline adduct represented by the following formula:

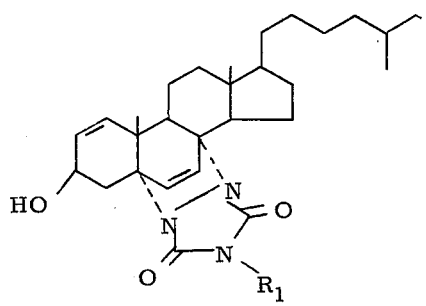

VII wherein $R_1$ is as defined above, with a peroxide, reducing the resulting 1α,2α-epoxide compound represented by the following formula:

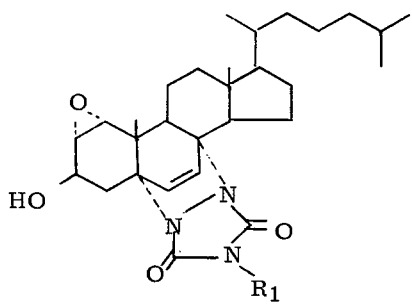

VIII wherein $R_1$ is as defined above, with an alkali metal aluminium hydride, subjecting the resulting cholesta-5,7-diene-1α,3β-diol (IX) to radiation of ultraviolet rays and allowing the resulting 1α,3β-dihydroxyprovitamin $D_3$ (X) to stand in darkness for a period of time.

1α-Hydroxycholecalciferol was found to have much higher biological activity than vitamin $D_2$ and vitamin $D_3$, and this compound is very valuable as a nutrition-promoting agent and an anti-rachitic agent.

In the process of this invention, since the 5,7-diene atomic group can be formed under mild conditions, occurrence of side reactions such as isolation of the hydroxyl group and rearrangement of the double bond can be prevented. Further, since it is unnecessary to protect the hydroxyl groups, 1α-3β-dihydroxyprovitamin $D_3$ can be prepared directly without splitting-off of the protective group. In these points, the process of this invention is advantageous over the above-mentioned known methods of DeLuca et al and Barton et al discussed above.

The process of this invention comprises the steps shown by the following reaction formulae:

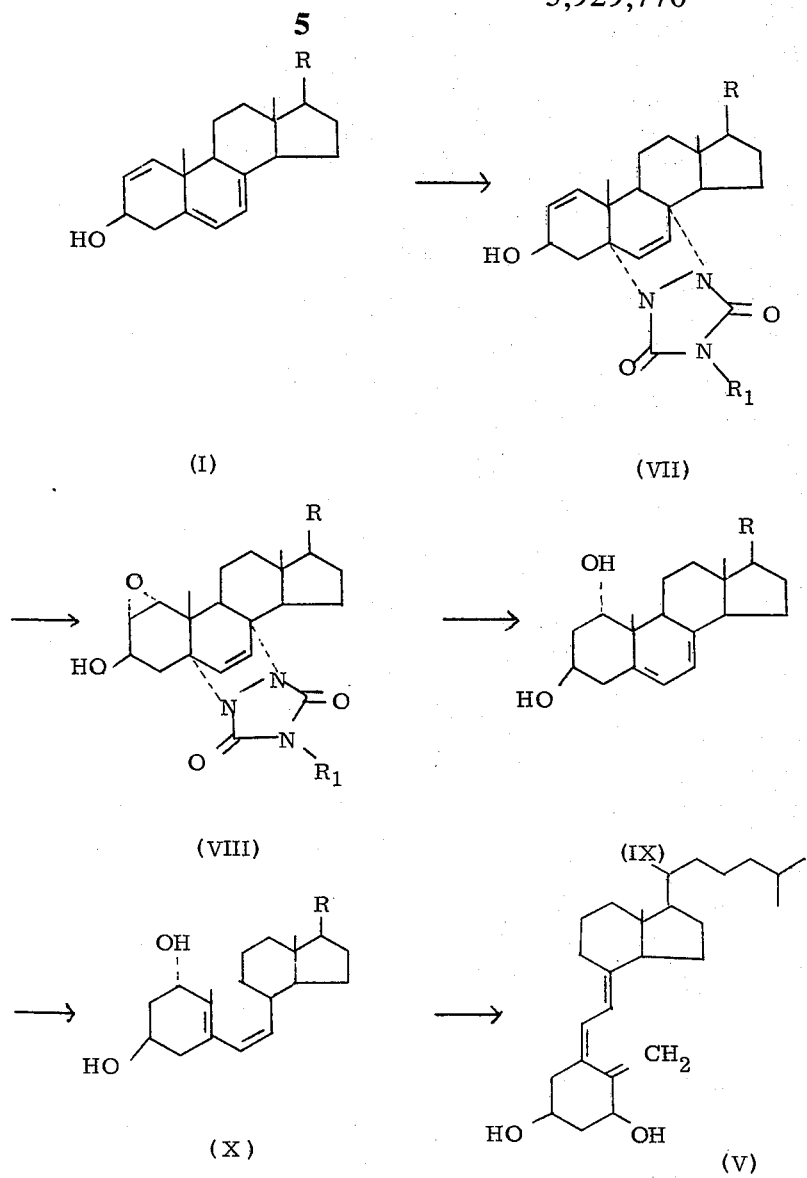

wherein R represents an alkyl side chain

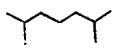

and $R_1$ is as defined above.

At the first step of the process of this invention, 1 mole of the compound of the formula (I) is reacted with 1 to 3 moles of a triazoline derivative of the formula (VI) in a solvent. The triazoline derivative of the formula (VI) is prepared according to the method disclosed in Chemische Berichte, 100, p. 678 (1967). Suitable triazoline derivatives include, for example, 4-phenyl-1,2,4-triazoline-3,5-dione, 4-(p-tolyl)-1,2,4-triazoline-3,5-dione and 4-methyl-1,2,4-triazoline-3,5-dione. Ordinary organic solvents, for example, benzole and tetrahydrofuran, are used as the solvent.

The so prepared compound of the formula (VII) is then oxidized with a peroxide. Good results are obtained when an organic peroxide such as peracetic acid, perbenzoic acid and m-chloroperbenzoic acid is used as the peroxide. The peroxide is used in an amount of 1 to 5 moles per mole of the compound (VII), and chloroform, methylene chloride, tetrahydrofuran or the like is used as the solvent for this oxidation reaction. By this oxidation, the 1α,2α-epoxide of the formula (VIII) and the 1β,2β-epoxide or the formula (VIII) are formed as products in yields of about 35% and about 45%, respectively. Both the products are separated and purified by chromatography using a column packed with silica gel.

The so prepared compound of the formula (VIII) is reduced with an alkali metal aluminum hydride in a solvent. Suitable alkali metal aluminum hydride, which can be used include, for example, lithium aluminum hydride and potassium aluminum hydride. Use of ether and tetrahydrofuran as the solvent is preferred. The reaction is carried out at 50° to 150°C, especially 50° to 100°C.

The so prepared compound of the formula (IX) is subjected to radiation of ultraviolet rays in a solvent. Ether, tetrahydrofuran, benzole or the like is used as the solvent. It is preferred that radiation of ultraviolet rays be conducted at a temperature approximating room temperature in an inert gas atmosphere.

The compound of the formula (VIII) prepared by radiation of ultraviolet rays can be directly fed to the next step without purification. When the compound of the formula (X) is allowed to stand for a period in the dark at room temperature in a solvent for several weeks, 1α-hydroxycholecalciferol of the formula (V) is obtained.

Having generally described the invention, a more complete understanding can be obtained by reference to certain specific examples, which are included for purposes of illustration only and are not intended to be limiting unless otherwise specified.

EXAMPLE 1

1. Preparation of cholesta-1,5,7-trien-3-one:

A reaction vessel is charged with 20 ml of dimethylsulfoxide, and a solution of 2 g of cholesta-1,4,6-trien-3-one in 20 ml of ether is added thereto. Then, the inside atmosphere of the reaction vessel is replaced with argon gas. Powdery potassium tertiary butoxide prepared from 1 g of potassium and 20 ml of tertiary butanol is added at a time to the above solution under violent agitation and water cooling. The reaction mixture liquid is violently agitated for 12 minutes and is poured into ice water saturated with carbon dioxide gas by addition of dry ice. Then, the mixture is extracted with 600 ml of a benzole-ethyl acetate mixture (1 : 2 v/v), cooled in advance to 0° to −5°C. The extract is promptly washed with a large quantity of ice water until the washing liquid becomes neutral, followed by drying and distillation of the solvent at room temperature under reduced pressure. When 1.6 g of the residue is recrystallized from methanol, 800 mg of cholest-1,5,7-trien- 3-one having a melting poing of 136° to 146°C is obtained. When this compound is allowed to stand still at room temperature, it gradually decomposes.

UV spectrum: $\lambda_{max}^{EtOH}$ 230,268,277,288 m ; $\lambda_{min}^{EtOH}$ 251 m NMR spectrum($\tau$ in $CDCl_3$):
  1H (3.25, d,J = 11 Hz)
  1H (4.2, d,J = 11 Hz)
  1H (4.42, d,J = 6 Hz)
  1H (4.63, d,J = 6 Hz)
  1H (6.6, d,J = 17 Hz)
  1H (7.07, d,J = 17 Hz)

2. Preparation of cholesta-1,5,7-trien-3 -ol:

A solution of 250 mg of sodium boron hydride in 20 ml of methanol is added dropwise under agitation to a solution of 500 mg of calcium chloride in 15 ml of methanol cooled to −10°C. The mixture is agitated for 20 minutes at a temperature maintained at −10°C. Then, a solution of 600 mg of cholesta-1,5,7-trien-3-one in 25 ml of ether is added dropwise to the above liquid mixture under agitation over a period of 20 minutes. The reaction mixture liquid is agitated for 1 hour at −10°C and for another 1 hour at 0°C. Then, acetone is added to the reaction mixture and the solvent is distilled under reduced pressure. The residue is mixed with water and the mixture is made weakly acidic by addition of acetic acid and extracted with methylene chloride. The extract is washed with water and dried with magnesium sulfate. Methylene chloride is distilled, and the residue is purified by chromatography using a column packed with alumina. The fraction eluted with ether-hexane (1 : 1 v/v) is recrystallized from methanol to obtain 400 mg of cholesta-1,5,7-trien-3$\beta$-ol having a melting point of 128° to 120°C.

UV spectrum: $\lambda_{max}^{EtOH}$ 263,271,281,292 m
Mass spectrum: m/e 382 (M$^+$), 364,349
NMR spectrum ($\tau$ in $CDCl_3$):
  2H (4.4, s)
  1H (4.4, d,J − 6 Hz)
  1H (4.60, d,J = 5 Hz)
  1H (5.8, d.d, J = 10 Hz and J = 6 Hz)
IR spectrum: $\nu_{max}^{KBr}$ 3400, 1620 cm$^{-1}$

EXAMPLE 2

In the same manner as in Example 1 (1), 2 g of cholesta-1,4,6-trien-3-one is isomerized, and the reaction mixture liquid is poured into ice water and extracted with a benzole-ethyl acetate liquid mixture. The extract is dried and the solvent is distilled to obtain 1.6 g of the residue. The residue is directly forwarded to the next reduction step without purification. More specifically, the above residue is dissolved in 30 ml of ether, and the solution is gradually added dropwise at −20°C under agitation to a solution of a potassium boron hydride prepared from 500 mg of potassium boron hydride, 1 g of calcium chloride and 50 ml of ethanol in the same manner as in Example 1 (2). After completion of the dropwise addition, the mixture is agitated for 1 hour at −10° to −15°C and for another 1 hour at 0°C. Then, the reaction mixture liquid is treated in the same manner as in Example 1 (2) to obtain 550 mg of cholesta-1,5,7-trien-3$\beta$-ol having a melting point of 128° to 129°C. When the so obtained product is mixed with the standard substance obtained in Example 1 (2), no lowering of the melting point is observed, and the UV, IR, NMR and mass spectra of both the products are quite in agreement with each other.

EXAMPLE 3

1. Preparation of 1,4-cyclized adduct of cholesta 1,5,7-trien-$\beta$ol and 4 phenyl-1,2,4 triazoline-3,5-dione:

A solution of 400 mg of cholesta-1,5,7-trien-3$\beta$-ol in 30 ml of tetrahydrofuran is cooled with ice, and 190 mg of 4-phenyl-1,2,4-triazoline-3,5-dione is added little by little to the solution under agitation. The mixture is agitated at room temperature for 1 hour and the solvent is distilled under reduced pressure. The residue is purified by chromatography using a column packed with silica gel. Fractions eluted with ether-hexane (7:3 v/v) are collected and recrystallization from ether gives 550 mg of a 1,4-cyclized adduct of cholesta-1,5,7-trien-3$\beta$-ol and 4-phenyl-1,2,4-triazoline-3,5-dione having a melting point of 178° to 182°C.

UV Spectrum: $\lambda_{max}^{EtOH}$ 255 m$\mu$($\epsilon$=4300)
IR spectrum: $\nu_{max}^{KBr}$ 34000, 1755, 1700 cm$^{-1}$
NMR spectrum: ($\tau$ in $CDCl_3$):
  5H (2,7, s, broad)
  1H (3.63, d,J = 8Hz)
  1H (3.75, d,J = 8Hz)
  2H (4.35, s)
  1H (5.05, t,J = 7Hz)
  1H (6.7, d.d,J = 15 Hz and 8 Hz)

2. Preparation of 1,4-cyclized adduct of cholesta-5,7-dien-3$\beta$-ol-1$\alpha$,2$\alpha$-epoxide and 4-phenyl-1,2,4-triazoline-3,5-dione:

1.25 g of the 1,4-cyclized adduct of cholesta-1,5,7-trien-3$\beta$-ol and 4-phenyl-1,2,4-triazoline-3,5-dione is dissolved in 50 ml of chloroform, and 560 mg of m-chloroperbenzoic acid is added to the solution. The mixture is agitated for 20 hours at room temperature, and 200 mg of m-chloroperbenzoic acid is further added and the mixture is agitated again for 20 hours. The reaction mixture liquid is diluted with chloroform, washed with a 10% aqueous solution of potassium carbonate and dried with magnesium sulfate. Then, the solvent is distilled under reduced pressure. The residue is purified by silica gel chromatography, and first effluent fractions eluted with ether are collected, and recrystallization from methanol gives 680 g of a crystal melting at 172°– 173°C. The second ether effluent fractions are collected, and recrystallization from methanol gives 400 mg of a 1,4-cyclized adduct of cholesta-5,7-dien-3β-ol-1α,2α-epoxide and 4-phenyl-1,2,4-triazoline-3,5-dione having a melting point of 152° to 154°C.

IR spectrum: $\nu_{max}^{KBr}$ 3400, 1750, 1690 cm$^{-1}$
Mass spectrum: m/e 398, 380, 365, 354, 351, 338
NMR spectrum ($\tau$ in CDCl$_3$):
  5H (2.8, s, broad)
  1H (3.75, d, J = 8Hz)
  1H (4.0, d, J = 8Hz)
  1H (5.2, m)

The above compound having a melting point of 172° to 173°C is a 1,4-cyclized adduct of cholesta-5,7-dien-3β-ol-1β, 2β-epoxide and 4-phenyl-1,2,4-triazoline-3,5-dione.

IR spectrum: $\nu_{max}^{KBr}$ 3400, 3215, 1760, 1710 cm$^{-1}$
Mass spectrum: m/e 398, 380, 365, 354, 351, 338
NMR spectrum ($\tau$ in CDCl$_3$):
  5H (2.8, s, broad)
  1H (3.75, d, J = 8Hz)
  1H (3.95, d, J = 8Hz)
  1H (5.15, m)

3. Preparation of cholesta-5,7-diene-1α,3β-diol:

A solution of 500 mg of the 1,4-cyclized adduct of cholesta-5,7-dien-3β-ol-1α,2α-epoxide and 4-phenyl-1,2,4-triazoline-3,5-dione in 40 ml of tetrahydrofuran is added dropwise under agitation to a solution of 600 mg of lithium aluminum hydride in 30 ml of tetrahydrofuran. Then, the reaction mixture liquid is mildly refluxed and boiled for 1 hour and cooled, and a saturated aqueous solution of sodium sulfate is added to the reaction mixture to decompose excessive lithium aluminum hydride. The organic solvent layer is separated and dried, and the solvent is distilled. The residue is purified by chromatography using a column packed with silica gel. Fractions eluted with ether-hexane (7:3 v/v) are collected, and recrystallization from methanol gives 400 mg of cholesta-5,7-diene-1α, 3β-diol.

$[\alpha]_D = -45°$ (as measured in chloroform)
NMR spectrum ($\tau$ in CDCl$_3$):
  1H (4.40, d, J = 6Hz)
  1H (4.73, d, J = 6Hz)
  1H (6.05, m, w1/2 = 25 Hz)
  1H (6.30, m, w1/2 = 8Hz)
Mass spectrum: m/e 400 (M$^+$), 382, 364, 341, 326, 312
UV spectrum: $\lambda_{max}^{EtOH}$ $^{(log\ \epsilon)}$
262 (3.92), 271 (407), 282 (4.11), 293.5 (3.87) mµ

4. Preparation of 1α,3β-dihydroxyprovitamin D$_3$:

A solution of 25 mg of cholesta-5,7-diene-1α,3β-diol in 650 ml of ether is subjected to radiation of ultraviolet rays for 14 minutes in an argon gas atmosphere by passing it through a Vycor filter using a 200-W high pressure mercury lamp (Model 654A-36 manufactured by Hanobia). The solvent is distilled at room temperature under reduced pressure. This operation is repeated twice, and 50 mg of the so obtained crude product is fractionated by chromatography using a column packed with 20 g of Sephadex LH-20. The first effluent fractions eluted with chloroform-hexane (65 : 35 v/v) give 13.5 mg of oily 1α,3β-dihydroxyprovitamin D$_3$. The compound exhibits a maximum ultraviolet absorption at 260 m in an ether solution.

5. Preparation of 1α-hydroxycholecalciferol:

A solution of 13.5 mg of 1α,3β-dihydroxyprovitamin D$_3$ in 200 ml of ether is allowed to stand still in the dark at room temperature in an argon gas atmosphere for 2 weeks. During this period, the position of the maximum ultraviolet absorption is shifted from 260 mµ to 264 mµ, and the absorption intensity becomes 1.6 times as high as the original intensity. The solvent is distilled at room temperature under reduced pressure, and the residue is purified by chromatography using a column packed with 10 g of Sephadex LH-20. The fractions eluted with chloroform-hexane (65 : 35 v/v) give 6.5 mg of oily 1α-hydroxycholecalciferol.

Mass spectrum: m/e 400 (M$^+$), 382, 364, 287, 152, 134

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. A process for the preparation of 1α-hydroxycholecalciferol characterized by reacting cholesta-1,5,7-trien-3β-ol with a triazoline-3,5-dione derivative represented by the following general formula

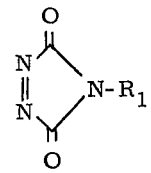

wherein R$_1$ represents an alkyl or aryl group, reacting the resulting 1,4-cyclized adduct represented by the following general formula:

wherein R$_1$ is defined as above, with a peroxide, reducing the resulting 1α,2α-epoxide compound represented by the following general formula:

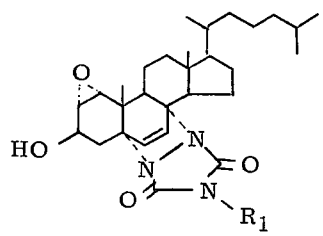

wherein R$_1$ is as defined above, with an alkali metal aluminum hydride, subjecting the resulting cholesta-5,7-diene-1α,3β-diol to radiation of ultraviolet rays and allowing the resulting 1α,3β-dihydroxyprovitamin D$_3$ to stand in the dark.

2. A process for the preparation of cholesta-1,5,7-trien-3β-ol characterized by isomerizing cholesta-1,4,6-trien-3-one in the presence of a basic catalyst and reducing the resulting cholesta-1,5,7-trien-3-one with a metal boron hydride.

3. The compound having the formula:
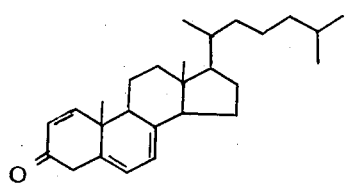
4. The compound having the formula:
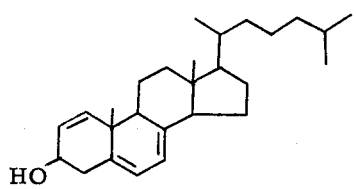
5. The compound having the formula:
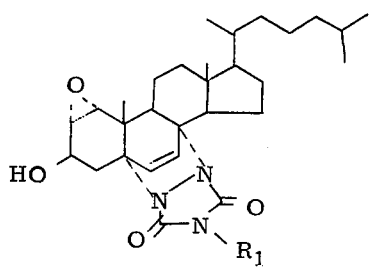
where $R_1$ is defined as above.
* * * * *